United States Patent [19]

Hwang

[11] Patent Number: 5,440,820

[45] Date of Patent: Aug. 15, 1995

[54] STRUCTURE OF AN ELECTRICAL MEASURING TAPE

[76] Inventor: Ming-Tsung Hwang, 56 Min Sheng Street, Feng Yuan, Taichung, Taiwan

[21] Appl. No.: 215,028

[22] Filed: Mar. 21, 1994

[51] Int. Cl.⁶ .......................... G01B 3/10; B65H 75/34
[52] U.S. Cl. .......................................... 33/761; 33/750; 33/769; 242/390.8
[58] Field of Search ................. 33/761, 755, 759, 760, 33/769, 750, 751; 242/84.8

[56] References Cited

U.S. PATENT DOCUMENTS

| 3,324,560 | 6/1967 | Snyder | 33/768 |
| 4,551,847 | 11/1985 | Caldwell | 33/755 |
| 4,575,944 | 3/1986 | Lin | 33/762 |
| 4,765,063 | 8/1988 | Sing | 33/755 |
| 5,044,089 | 9/1991 | Petkovic et al. | 33/755 |
| 5,104,056 | 4/1992 | Jannotta et al. | 33/761 |

*Primary Examiner*—Christopher W. Fulton

[57] ABSTRACT

An improved electrical measuring tape that automatically extends and retracts the tap. Switches control a battery powered motor that drives a wheel around which the tape is wound. Induction dots near both ends of the tape cause a short-circuit to stop extension or retraction.

3 Claims, 3 Drawing Sheets

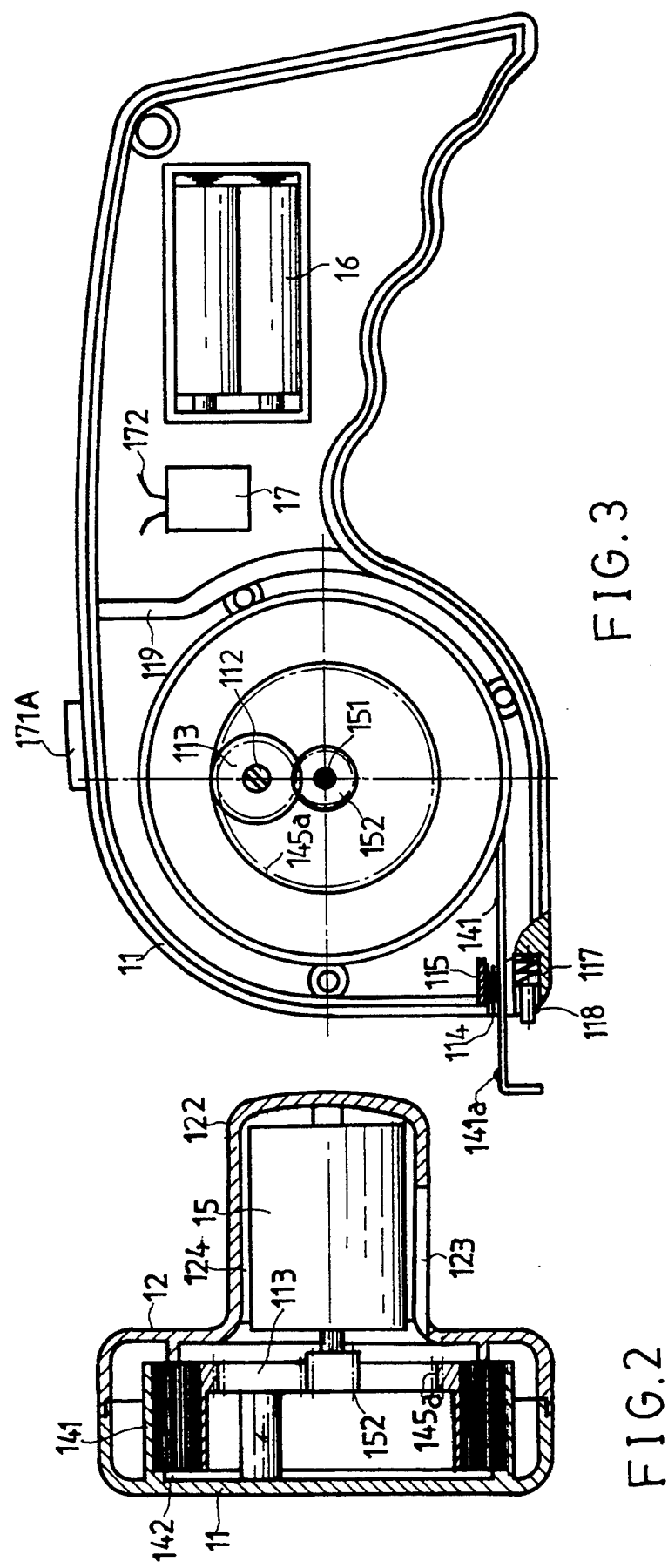

STRUCTURE OF AN ELECTRICAL MEASURING TAPE

BACKGROUND OF THE INVENTION

The present invention relates to an electrical measuring tape and more specifically to a improved structure for users to measure lengths of objects more conveniently and effectively.

DESCRIPTION OF THE PRIOR ART

Traditional measuring tapes are designed such that the users have to pull the protruding metal blades of the tapes to hook on sides of object, which is obviously very inconvenient for the users. The users must stabilize the protruding metal blades with one hand while pulling the tapes with their other hand of the objects to be measured don't have any suitable projections for the blades to hook on. Two people may therefore be required to measure large objects or areas.

PURPOSE OF THE INVENTION

It is the purpose of this invention to provide a novel device by which an electrical measuring tape can be lengthened or shortened automatically to obtain the most convenient and effective measuring.

SUMMARY OF THE INVENTION

The present invention comprises a bottom shell, a left top shell, a right top shell, a measuring tape device, a motor, a set of batteries and an inch-unit actuating device, wherein:

The bottom shell has a flat circular stable ring with a rod protruding from an inner surface of the bottom shell at a slightly off-center position. The rod is attached to a gear wheel. There is a metal blade on the upper side of an opening which is located at the front edge of the bottom shell. The opening allows a measuring tape to pass through. A spring and a blockout device are located at the bottom of the opening. The blockout device has the function of blocking electrical current. The left top shell has a space for locating the motor and is shaped to attach to the bottom shell. The right top shell is made to be easily opened to change to batteries.

The measuring tape device comprises a measuring tape and a wheel around which the measuring tape is wound. The wheel has a hole in the center with gear teeth. The wheel is located in the flat circular stable ring inside the bottom shell. The diameter of the wheel is just a bit smaller than the diameter of the stable ring. The gear teeth of the hole are attached to the gear wheel which is actuated by the motor.

Each end of the measuring tape has a protruding induction dot on it. A protruding metal blade head is bend downward at the first end of the measuring tape.

The batteries provide electrical current for the rotation of the motor through the inch-unit actuating device. The lengthening and shortening motions of the measuring tape can thus be effectively controlled. A cylindrical protrusion on the center of the motor is attached to a teeth wheel and thus can actuate the gear wheel in the bottom shell. The right top shell provides space for location of the set of batteries.

The inch-unit actuating device comprises a positive and negative device, a crystal and a resistor. The inch-unit actuating device is also connected to the motor and two switches by wires, and thus can control the operation of the motor.

The switches can be operated to actuate the motor and thus cause the wheel to turn clockwise or counter clockwise to control lengthening or shortening of the measuring tape. The protruding induction dots on each of the measuring tape can actuate transient periods of short-circuiting of the motor to prevent excessive lengthening and shortening of the measuring tape. When the protruding metal blade head touches the blockout device inside the opening, it will short-circuit operating of the motor.

BRIEF DESCRIPTION OF THE DRAWINGS

FIG. 2 is a top view;

FIG. 3 is a sectional front view of the tape; and

DETAILED DESCRIPTION OF THE INVENTION

Figure 1:
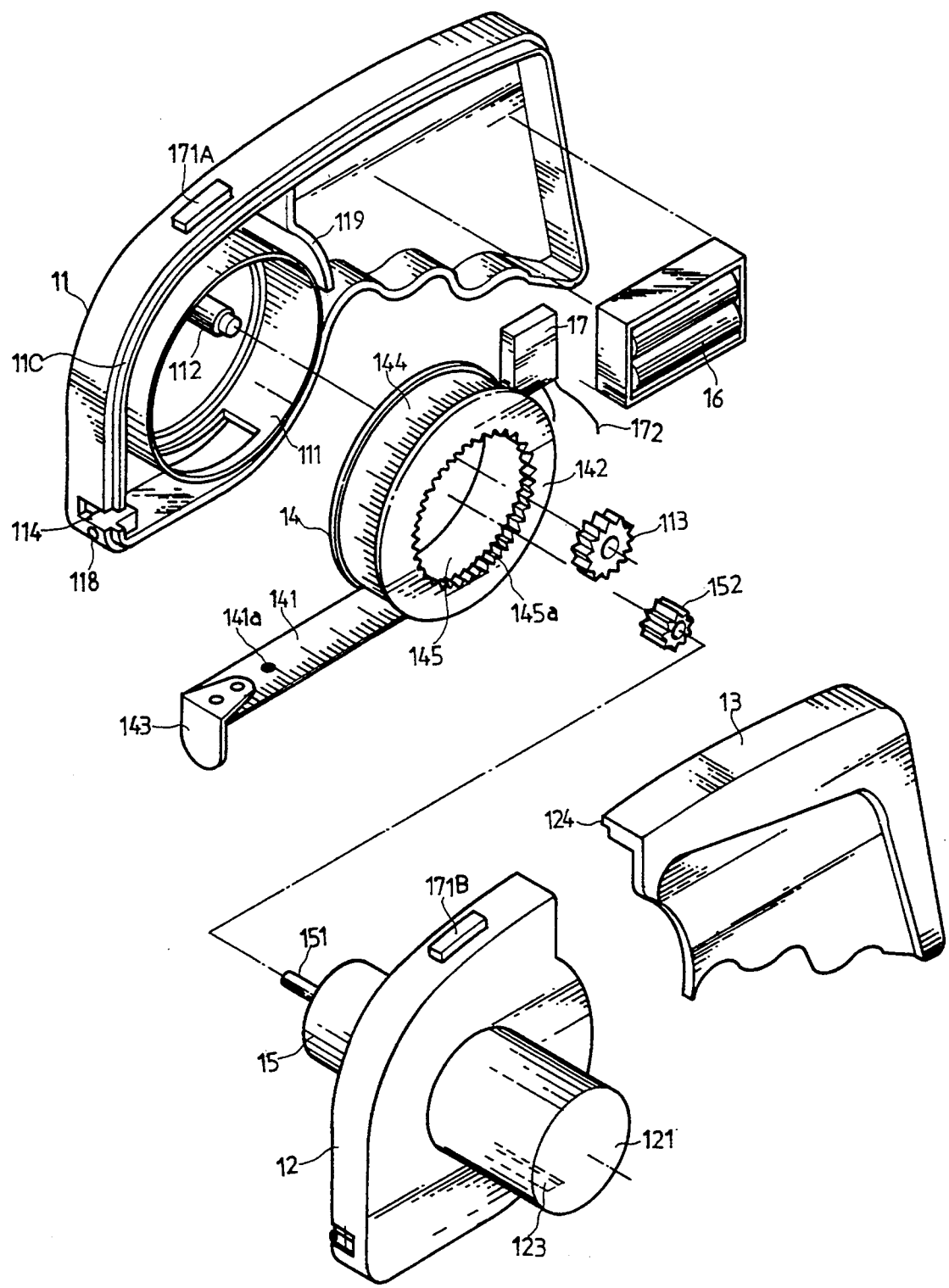
FIG. 1 is an exploded perspective view of an improved structure of an Electrical Measuring Tape.

An electrical measuring tape comprises a bottom shell 11, a left top shell 12, a right top shell 13, a measuring tape device 14, a motor is, a set of batteries 16 and a inch-unit actuating device 17. The bottom shell 11 has a space inside for location B of a flat circular stable ring 111. A rod 112 is located just off-center on an inner surface of the stable ring 111. A gear wheel 113 is attached to the rod 112. An opening 114 for the tape is located at a lower front area of the shell 11. A metal blade 115 with a spring biases the tape from above. A spring 117 and a blockout device 118 are located on a lower side of the opening 114. The blockout device 118 enable short-circuiting of the electrical current. Two switches 171A and 171B are situated above the stable ring 111, and protrude outside the bottom shell 11. There is a dividing piece 119 to divide the bottom shell 11 into left and right compartments. The inch-unit actuating device 17 and batteries 16 are in the right compartment of the bottom shell 11. The bottom edge of the right compartment of the bottom shell 11 is curved for easy holding by users. The edge of the bottom shell 11 includes a trough 11c to snap together with a protruding edge 124 of the left top shell 12 and the right top shell 13. The left top shell 12 has a space 121 to receive the motor 15. The bottom edge of the right top shell 13 is curved to snap together with the right compartment of the bottom shell 11. The batteries 16 can be easily changed by pulling off the right top shell 13.

Figure 4:
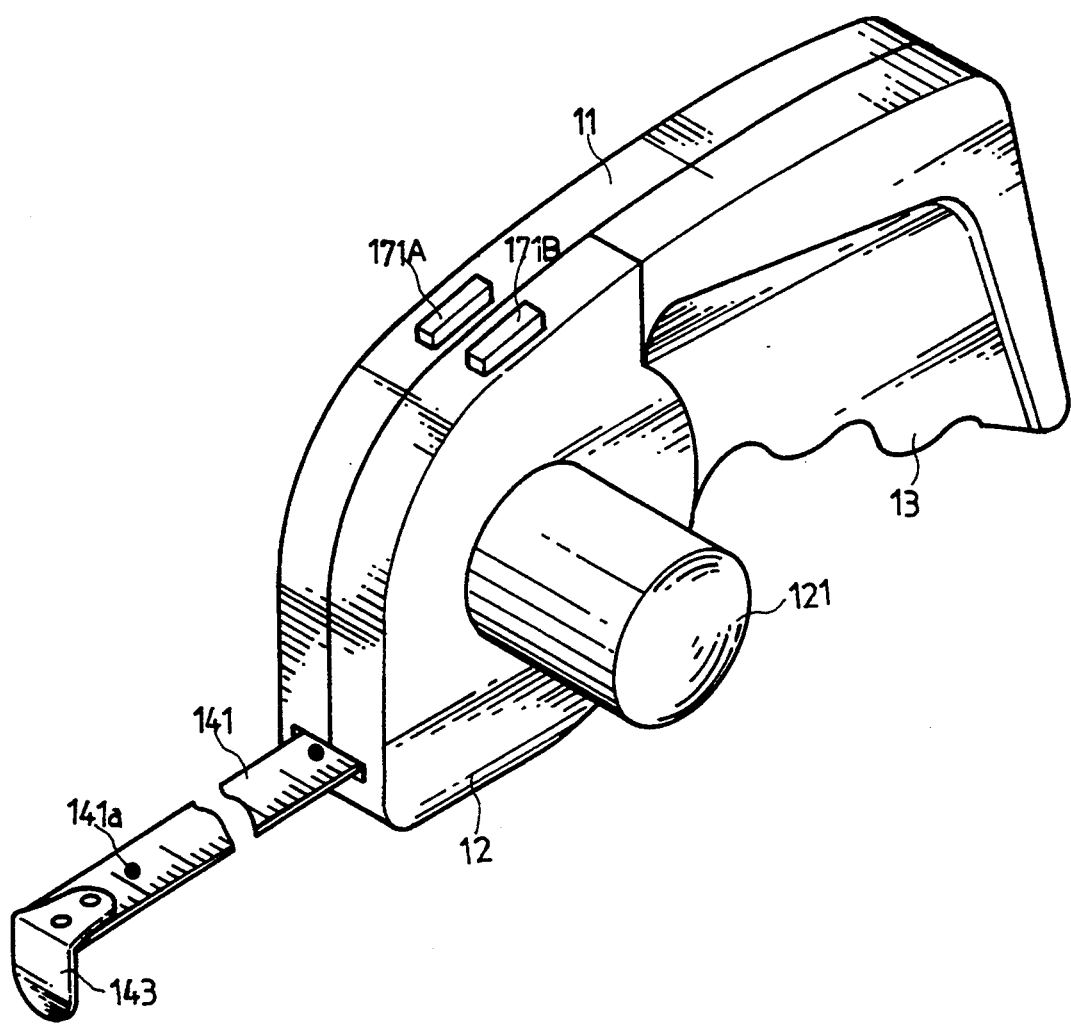
FIG. 4 is perspective view of the tape.

The measuring tape device 14 comprises a measuring tape 141 wrapped around a wheel 142. The wheel 142 has a hole 145 in the center with a gear teeth 145a around its inner circumference to mesh with the gear wheel 113. The wheel 142 is located in the stable ring 111. Referring to FIG. 4, near both ends of the measuring tape there are protruding induction dots 141a, spaces 5 or 10 cm apart at the ends of the measuring tape 141. The induction dots 141a cause a transient short-circuit of the motor 15, thus slowing tape speed.

The set of batteries 16 provides electric current to operate the motor 15, which is controlled by the switches 171A and 171B. One switch causes the motor 15 to turn clockwise and the other causes the motor 15 to turn counter-clockwise. A cylindrical protrusion 151 on the center of the motor 15 is attached to a teeth wheel 152 and thus can actuate the gear wheel 113 to rotate the wheel 142, which moves the measuring tape 141. The gear ratio of the teeth wheel 152 and gear wheel 113 slows the turning speed of the device.

The inch-unit actuating device 17 comprises a positive and negative device, a crystal and a resistor. The inch-unit actuating device 17 is connected to the motor 15 and the two switches 171A and 171B by wires 172, and thus can control the direction of rotation of the motor 15.

According to the improved structure of an electrical measuring tape explained above, we assume that pressing switch 171A controls clockwise rotation of the motor 15 and pressing switch 171B controls counterclockwise turning of the motor 15. When the user presses switch 171A, the motor 15 turns clockwise and thus actuates the teeth wheel 152 to move the gear wheel 113 and turn the wheel 142 to extend the measuring tape 141. The inch-unit actuating device 17 is actuated until one of the protruding induction dots on the measuring tape 141 touches the metal blade 115 inside the opening 114 in the bottom shell 11. The inch-unit actuate device then gives out a signal magnified by the crystal and thus stops the motor 15 from turning. If the user wants to measuring tape 141 to be extended or retracted, he simply releases the pressing switch and presses the switches 171A and 171B again to lengthen or shorten the measuring tape 141.

The measuring tape 141 moves until the protruding induction lot 141A touches the metal blade 115, the motor 15 then being short-circuited for a transient period. Afterwards, if the user releases the pressing switch and presses it again, the measuring tape 141 is moved again until the protruding metal blade head 143 touches the blockout device 115 inside the opening 114. This short-circuits the motor 15 and thus the measuring tape device 14 is not able to operate. Therefore, when using the present invention, the user has to pull the protruding metal blade head 143 just a bit away from the blockout device 118 in order to actuate the motor 15 by pressing the switch 171A to extend the measuring tape 141. Conversely, the protruding induction dot near the other end of the measuring tape 141 has the same function as the first protruding induction dot, that is to short-circuit the motor 15 to stop further movement of the measuring tape 141.

It should be understood that although specific embodiments of the invention have been described herein in detail, such description is for purposes of illustration only and modifications may be made thereto by those skilled in the art within the scope of the invention.

I claim:

1. An improved structure of an electrical measuring tape comprising:
    a bottom shell, a left top shell, a right top shell, with a flat circular stable ring in a left compartment of said bottom shell, a rod situated slightly off-center in said stable ring, said rod being connected to a gear wheel, there being an opening at a lower front portion of said bottom shell, with a metal blade on a top side of said opening, a spring and a blockout device being located on a bottom portion of said opening, said blocknut device being adapted to block electrical current, said left top shell having a space therein and being adapted to snap together with a left compartment of said bottom shell, said right top shell being adapted to be easily opened away from a right compartment of said bottom shell:
    the device further comprising a measuring tape and a wheel around which said measuring tape is wrapped, wherein said wheel has a hole in the center, said hole including gear teeth, said wheel being located in said flat circular stable ring inside said bottom shell. The said gear teeth of said hole being attached to and actuated by said gear wheel:
    the device further including protruding induction dots located near both ends of said measuring tape, a first end of said measuring tape having a protruding metal blade head being bent downward,
    a motor being actuated by batteries controlled by an inch-unit actuating device to control rotation of said motor, thus allowing said measuring tape to be extended or retracted, said motor having a cylindrical protrusion in a center which is attached to a teeth wheel and thus can actuate said gear wheel, said left top shell including a space for receiving said motor, said batteries being located beneath said right top shell;
    said inch-unit actuating device comprises; a positive and negative device, a crystal and a resistor, and is connected to said motor and said switches by wires and thus can control rotation of said motor;
    said switches actuating said motor and thus achieve causing said wheel to turn clockwise or counterclockwise to control extension and retraction of said measuring tape, said protruding induction dots, at both ends of said measuring tape causing transient periods of short-circuit of said motor to prevent excessive extension and retraction of said measuring tape, said protruding metal blade head causing a short circuit when it touches said blockout device.

2. The device of claim 1 wherein:
    said bottom shell and a dividing piece having edges with a depressing therein so as to snap together with said left and right top shells with a protrusion on the edges thereof.

3. The device of claim 1 wherein:
    a bottom portion of a right compartment of said bottom shell and a bottom edge of said right top shell being shaped to be conveniently held by a user.

* * * * *